United States Patent [19]

Szewczyk

[11] 4,408,507
[45] Oct. 11, 1983

[54] MACHINE TOOL INDEXING MECHANISM

[75] Inventor: Richard S. Szewczyk, Rochester, N.Y.

[73] Assignee: USM Corporation, Farmington, Conn.

[21] Appl. No.: 238,015

[22] Filed: Feb. 25, 1981

[51] Int. Cl.³ .............................................. B23B 29/04
[52] U.S. Cl. .................................... 82/36 A; 82/36 R
[58] Field of Search .................... 82/36 A, 36 R, 36 B

[56] References Cited

U.S. PATENT DOCUMENTS

| 3,368,265 | 2/1968 | Kirkham | 82/36 A |
| 3,838,500 | 10/1974 | Wirfelt | 82/36 R |
| 3,981,607 | 9/1976 | Jorgensen | 82/36 A |
| 4,024,777 | 5/1977 | Fogarty | 82/36 A |
| 4,326,437 | 4/1982 | Fischer | 82/36 A |

FOREIGN PATENT DOCUMENTS

| 53-36788 | 4/1978 | Japan | 82/36 R |
| 53-36789 | 4/1978 | Japan | 82/36 R |
| 54-20490 | 2/1979 | Japan | 82/36 R |

Primary Examiner—Robert E. Garrett
Assistant Examiner—Jerry Kearns
Attorney, Agent, or Firm—Vincent A. White

[57] ABSTRACT

A mechanism for successively presenting new edges of a tool for application against a rotating member being machined. The tool has an annular edge which is forced against a rotating member, by emplacement in the distal end of a movable arm. The arm has a ratchet mechanism into which the tool is secured. The ratchet mechanism rotates the tool on the end of the arm to advance a new edge thereof, against the member being machined. The ratchet is activated by an indexing piston which causes the ratchet and tool associated therewith, to rotate with respect to the member being machined, to present a proper edge thereagainst, minimizing machine downtime for tool adjustment and repair.

2 Claims, 5 Drawing Figures

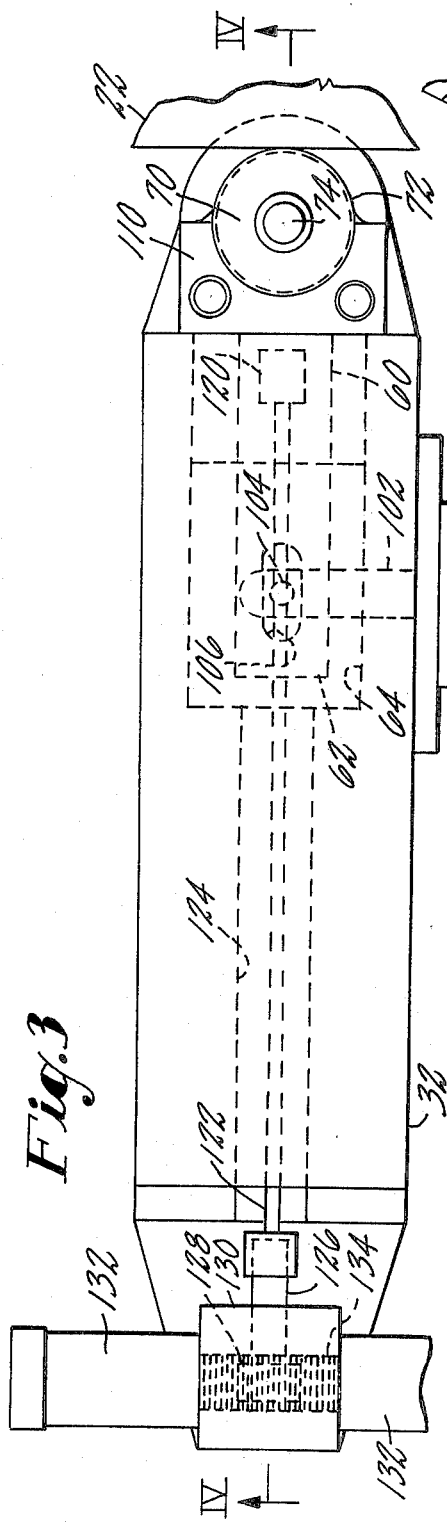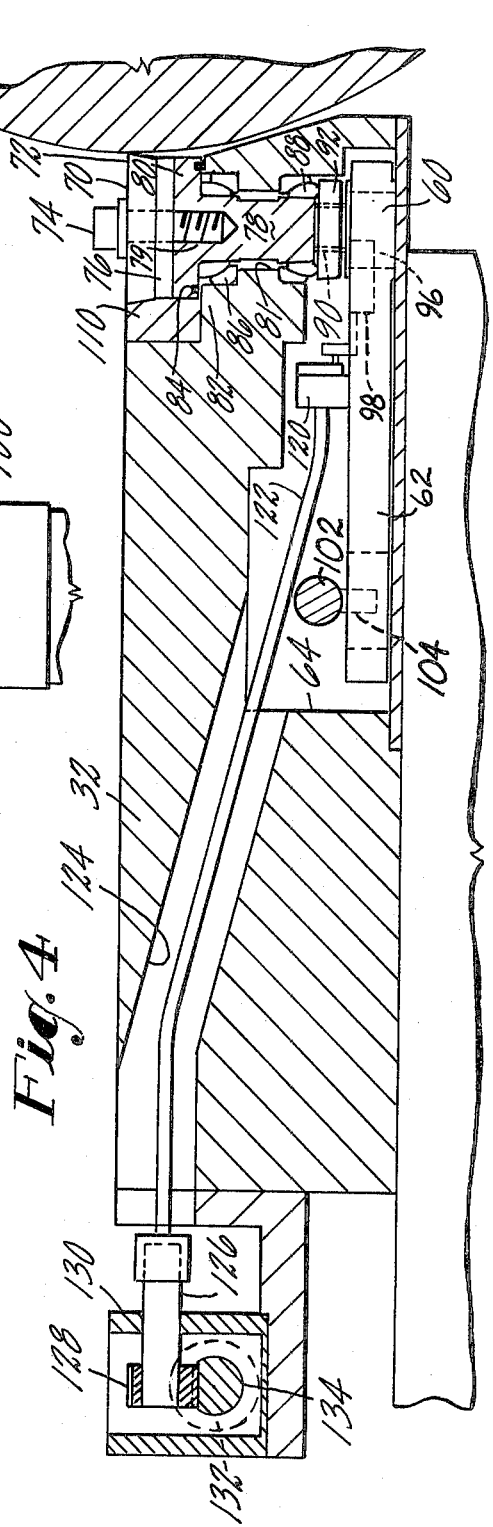

MACHINE TOOL INDEXING MECHANISM

BACKGROUND OF THE INVENTION (1) Field of the Invention

This invention relates to machine tool holders, and more particularly to mechanisms for rotating an individual tool against a member being turned so as to present successive new edges against the member being machined.

(2) Prior Art

The machine tool industry has in recent years been attempting to automate their operations and minimize their machine cycle time. In machining the diameter or turning down a shaft of some sort, the tool which we are involved with here is a disc-like cutting tool having at least one sharpened peripheral edge which does the cutting and which has had to have been manually loosened and discarded after it has become worn, and a new tool inserted into the cutting tool support of the machine. This maximized the cycle time of the operation, wherein the machine operator exchanged the cutting tool insert on a machine as needed during a series of operations on an item being turned.

An advance in the art was introduced by Sandvik, Inc. on their T-Max Automatic profiling machine, wherein the tool that does the actual cutting of the item being turned, is fed, in shotgun magazine fashion, to a clamp on the machine. Once the proper quantity of material has been removed/or the tool has been worn down along only a small arcuate portion thereof, to a point of permitting no further cutting action, it is ejected and replaced automatically by a fresh tool fed from the magazine supply. This approach is unsatisfactory, because the tools are used-up somewhat prematurely. The cutting tools in these turning machines may be disc-shaped, and have at least one peripheral edge which is capable of being used in its entirety. The manual operation of loosening the tool in the machine arm, and then rotating the tool and retightening it did not waste the tools, but it certainly added to a long cycle time for an average workpice, especially when the same tool may otherwise be partially rotated as many as twenty four times and still have the same cutting or machining capabilities as about twenty four other cutting tools. Thus, the manual operation may use twenty-odd fewer tool bits, saving money at that expense, but the cycle time is longer, because the machine operator has to work to continually readjust the tool accordingly.

It is thus an object of the present invention, to provide a tool indexing mechanism which overcomes the objections of both the manual procedure and the automated procedure of tool maintenance, which was an expensive feature of prior art metal turning machines.

It is a further object of the present invention, to provide a tool indexing mechanism for metal turning machines, which will get full use of any tool used therewith.

It is yet a further object of the present invention, to provide a tool indexing mechanism which will minimize the machine operator's time for changing tools.

BRIEF DESCRIPTION OF THE INVENTION

The present invention involves a metal turning lathe or machine having a tool bar which comprises a holder for a tool applyable against the metal member being turned. The tool bar supports a disc-shaped tool during the machining operation. The tool on the end of the tool bar is supported on and rotated by a ratchet device which holds the tool and its support bearing. The ratchet device is arranged within the tool bar, and has an actuating arm therewith, that is hingedly connected to a double acting indexing piston. The indexing cylinder is attached to a side wall of the tool bar, and has a piston rod which extends into the tool bar and coacts with actuating arm of the ratchet device, by a pin on the end of the rod being slidably received in a slot in the distal end of the arm. Pressurization of the indexing cylinder according to a set of prescribed instructions built into the control circuitry of the machine, causes the actuating arm to be reciprocally moved through an arcuate path. Movement of the actuation arm effects rotation in the ratchet device which supports the tool. Thusly, the tool itself may be incrementally and intermittently rotated to present fresh sharp edges consecutively against the surface being turned, without the need for operator intervention or machine down-time.

A pair of tool bars are arranged on a planar cross-slide. Each tool bar is adjustably arranged on the cross-slide towards and away from the axis of rotation of the member being burned. The cross-slide is movable parallel to the axis of the member being turned. The member being turned has a pair of cross-slides in a working relationship with it, one being disposed horizontally against it from a "front" side and the other being disposed horizontally in a working relationship, from the "back" side.

Each individual tool insert is supported at the distal end of the tool bar is of disc-like configuration, having a peripheral edge which is contoured to provide cutting efficacy as to the member being turned. The tool insert is bolted to a tool insert holder. The tool insert holder has a shoulder portion that rests on an annular cut-out on the end of the tool bar. A spherical bushing is disposed between the insert holder and the cut-out portion of the tool bar, the insert holder also comprising a central shaft extending therethrough, into a bore through the tool bar, the shaft also being seated in another spherical bushing, the shaft being screwed into a preloading nut, that properly seats the insert holder between the bushings while the shaft is in tension, allowing it to turn, with the tool insert, yet holding it during the cutting operation from undesirable vibrations or looseness. The shaft is securably mated with the ratchet device.

Actuation of the indexing cylinder as aforementioned, thus effects intermittent rotation of the tool holder and cutting tool itself because the ratcheting drive of the ratchet device holds the shaft of the tool holder to which the tool is secured, thus advancing a sharp edge to the member being turned, until its full 360° periphery is worn and may then be replaced.

BRIEF DESCRIPTION OF THE DRAWINGS

The objects and advantages of the present invention will become more apparent, when viewed in conjunction with the following drawings, in which:

FIG. 3 is a plan view of a tool bar of the present invention, and

FIG. 4 is a view taken along the lines IV—IV of FIG. 3.

FIG. 5 is a schematic plan view of a pawl and ratchet device for indexing the cutting tool.

DESCRIPTION OF THE PREFERRED EMBODIMENTS

Figure 1:
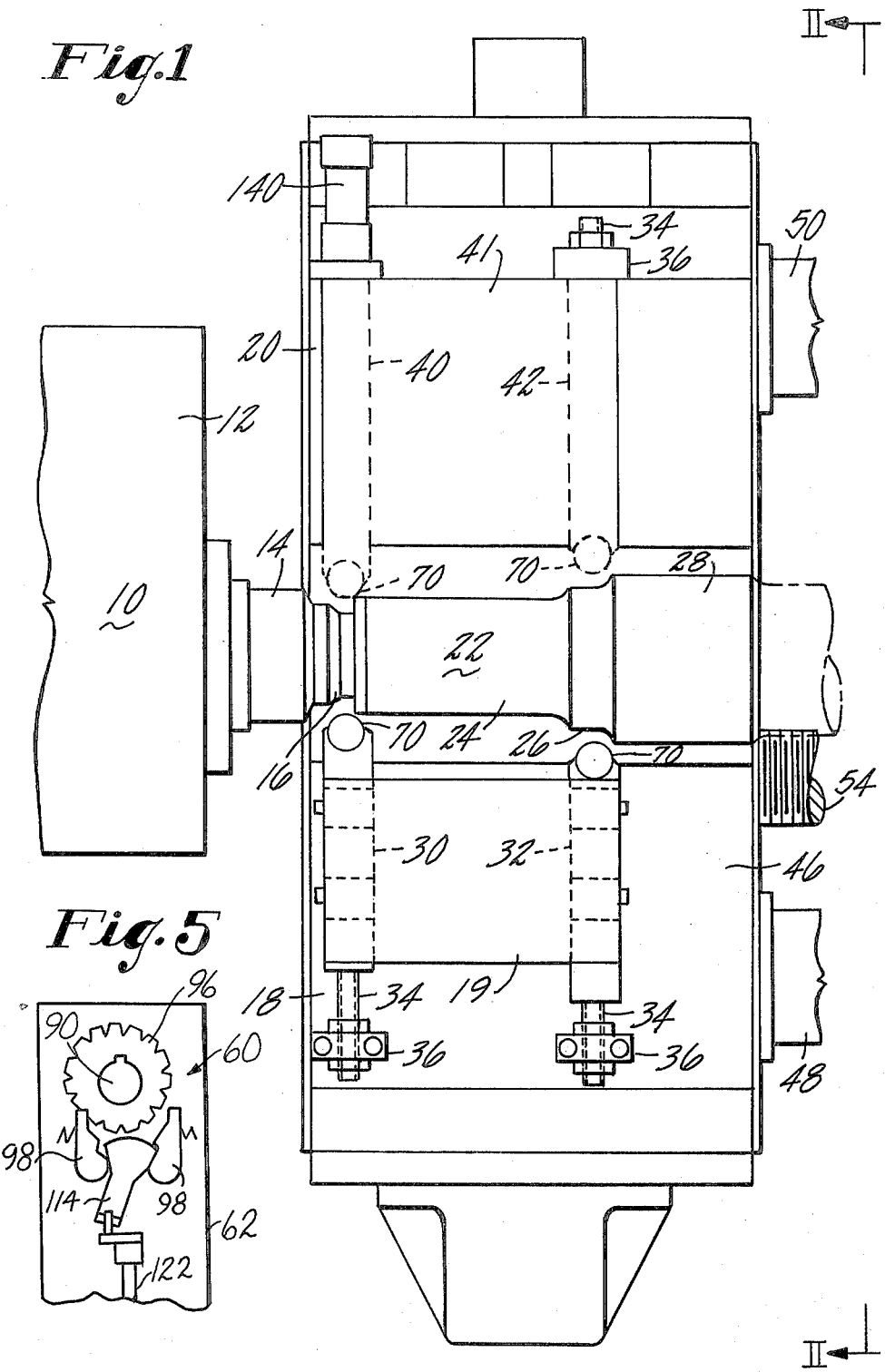
FIG. 1 is a plan view of a portion of a metal turning machine showing a portion of an axle being turned.

Referring now to the drawings in detail, and particularly to FIG. 1, there is shown a turning machine or machine lathe 10, only a portion of one end being shown. The machine lathe 10, comprises a headstock 12 which may include a motor and connecting gear, not shown, as axle drive 14, a drive connector 16, a front cross-slide 18 and a rear cross-slide 20, all relating to a railroad car axle 22, in this embodiment, the member being turned and machined. Only a portion of the axle 22 is shown, that is, a journal 24, around which, the bearings of a railroad car would be disposed, a dust guard portion 26 which would receive a shield, and a wheelseat portion 28, around which, the railroad wheel, not shown, would be disposed, and the barrel of the axle 22, shown partially in phantom lines, would then extend to the other end thereof, for the other wheelseat, dust guard and journal.

Figure 2:
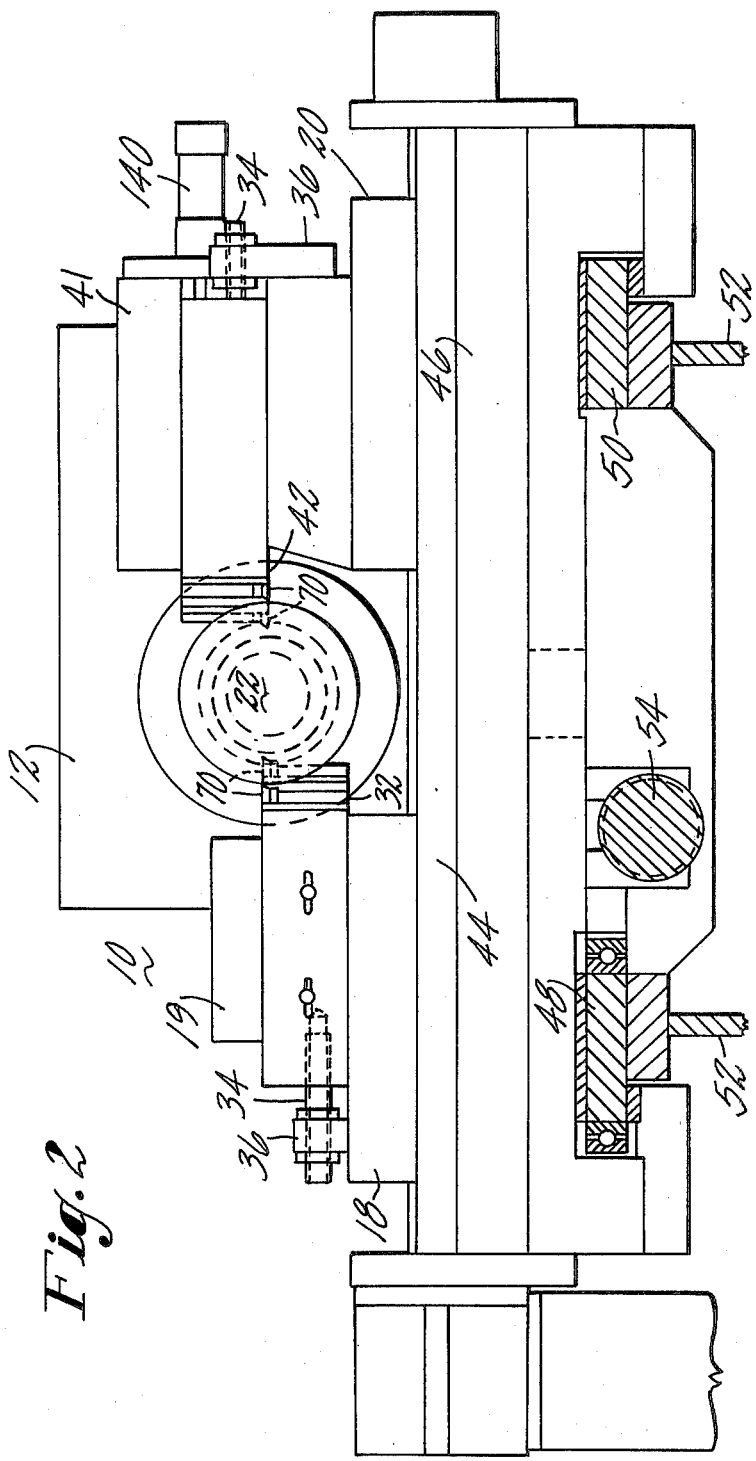
FIG. 2 is a view taken along the lines II—II of FIG. 1.

A pair of insert indexers or tool bars 30 and 32, are shown movably diposed between a secured cover 19 and the front cover-slide 18. Each tool bar 30 and 32, is movable on the front cross-slide 18, with respect to the front cross-slide 18, towards and away from the axis of rotation of the axle 22, by their being articulatably arranged with a threaded shaft 34 that is threadably disposed in a radial adjustment mechanism 36. The radial adjustment mechanism 36 is arranged on both the front and rear cross-slides 18, and 20 and rotation of the threaded shaft 34 with respect thereto, causes the movement of each respective tool bar 30 or 32 toward or away from the axle 22, accordingly. A pair of tool bars 40 and 42, are shown movably secured under a cover 41 on the rear cross-slide 20, and are inverted as compared to the tool bars 30 and 32 on the front cross-slide 18. The front and rear cross-slides 18 and 20 are arranged with a ball screw 44 on a carriage 46, as shown in FIG. 2. The carriage 46 is slidably arranged on an arrangement of front and rear guide ways 48 and 50, supported on a bed 52. The carriage 46 is movably disposed on the front and rear guide ways 48 and 50, by interaction with a carriage ball screw 54 arranged between the carriage 46 and the bed 52 in a manner known in the industry.

Each of the tool bars 30, 32, 40 and 42 as shown in an exemplary manner in the plan view of FIG. 3, has a tool end thereon into which a ratchet device 60 is arranged. The ratchet device 60 encloses a ratchet gear 96, secured to a tool holder 78, a pair of pawls 98, pawl springs 112 and a control lever 113, shown schematically in FIG. 5, the ratchet device 60 also includes an actuating arm 62, which extends into a cavity 64 in the tool bar. Ratchet devices of the type used are commonly known, typically one commercially available as a Lowell Ratchet Device.

A cutting tool or insert 70 of disc-shape, having a peripheral cutting edge 72 applicable against the shaft or axle 22 being turned, has a through bolt 74 which secures the cutting tool 70, and a shim 76, to an insert holder 78. The insert holder 78 has a body portion 79 and an annular shoulder 80. The body portion 78 of the insert holder 78 is disposed in a bore 81 in the insert indexer 32. The shoulder 80 is disposed in contiguous relationship to a shoulder 82 on the end of the insert indexer 32, with an "O" ring 84 arranged therebetween. A first pair of spherical bushings 86 are arranged in an annular cut-out at a first end of the bore 81 and a second pair of spherical bushings 88 are arranged in another annular cut-out at the other end of the bore 81. A threaded shaft 90 extends off of the end of the body portion 79, coaxial therewith, and into a preload nut 92. The threaded shaft 90 extends securely into the gear 94 (FIG. 5) in the ratchet device 60. The preload nut 92 is tightened onto the threaded shaft 90 to seat the respective pairs of spherical bushings 86 and 88 to put the body portion 79 in tension.

A double acting indexing cylinder 100, is attached to the side of the insert indexer 32, as shown in FIG. 3. The indexing cylinder 100 has a piston rod 102 which extends into the cavity 64 and may be pivotally connected by a pin 104 in a slot 106 to the distal end of the actuating arm 62. The indexing cylinder 100 is connected to a proper circuit, not shown, which effectuates its movement upon receipt of a proper signal.

An insert backup plate 110 bolted to the distal end of the tool bar 32, shown in FIGS. 3 and 4, provides close partial circumferential support to the cutting tool 70 during the turning operation. The backup plate 110 is generally "C" shaped and is arranged radially adjacent the cutting tool 70 in the end of the tool bar 32 to minimize extraneous movement of the cutting tool 70 with respect to the tool bar 32.

During operation of the machine 10, when the front and rear cross-slides 18 and 20 are pressed against the member being turned, the cutting edge 72 of each insert or cutting tool 70 becomes worn. The front and rear cross-slides 18 and 20 may be withdrawn from the member being turned and the proper circuits, now shown, may actuate each of the respective indexing cylinders 100 to effectuate limited reciprocating arcuate movement in each actuating arm through the pawl 98 and ratchet 96 62. Reciprocal movement in the actuating arm effectuates intermittent rotational motion in the threaded shaft 90 which extends out of the ratchet device 60. Limited rotation in the threaded shaft 90 causes limited rotation in the cutting tool 70, enough to effectuate the rotational displacement of a worn portion of the peripheral cutting edge 72 and substitution thereof by an unworn portion thereof advanced to the "cutting" location to be applied against the shaft or axle 22 being turned.

An alternative embodiment of the insert indexer 32, is also shown in FIGS. 3 and 4, wherein a control lever positioner 120 is secured to the ratchet device 60 and is pivotally linked to the control lever 114, therein. A flexible shaft 122 which serves as a fulcrum point about which an arm moves in the positioner, to swing the control lever one way or the other in the ratchet device 60, extends from the control lever positioner 120, through a channel 124 in the insert indexer 32, to a stud 126 which is attached to a pinion gear 128 in a rotary actuator 130. A pair of cylinders 132 are secured to opposite sides of the rotary acutator 130 and are each connected to a rack gear 134 which itself is mated with the pinion gear 128. Actuation of either of the pistons 132 through a proper circuit, effectuates longitudinal movement of the rack 134 in the rotary actuator 130, which then causes limited rotational movement in the pinion gear 128, thence rotational movement into the stud 126 and into the flexible shaft 122. The limited twist or rotational movement of the flexible shaft 122 effects angular movement in the links in the control lever positioner 120, to switch the control lever 114 in the ratchet device 60 to prevent rotation of the cutting tool 70 in one direction, then to permit rotation of the cutting tool 70 in the other direction, if desired, upon proper actuation of the indexing cylinder 100. A further embodiment shown in FIG. 1, includes a pressurizable cylinder 140 which is arranged in effectuate longitudinal movement of one of the tool bars 40 towards and away from the axle 22 being machined. Actuation of the pressurizable cylinder 140 by proper means, not shown, against the axle 22, is sufficient to provide a final pass of only a single tool bar 40 for the finishing operation on the shaft being turned.

Thus there has been shown a mechanism for advancing the sharp edge of a cutting tool, into contact with the workpice, without requiring substantial down-time on the part of the machine, while minimizing cycle time of the entire operation, thus saving on the expense of actually replacing or manually adjusting a cutting tool after only a small arcuate portion thereof is worn.

I claim:

1. A support for a cutting tool comprising: a circular insert having a cutting edge extending along the periphery of the insert, a holder to which the insert is secured, means mounting the holder for rotation in the support, a mechanism for incrementally indexing the holder, including a pawl and ratchet mechanism in driving relation to one end of the holder, an actuating arm carrying the indexing mechanism and swingable about the axis of rotation of the holder, a reciprocating device connected to the arm for swinging the arm to cause the pawl and ratchet mechanism to incrementally rotate the holder to present successive portions of the insert cutting edge, a control device to change the direction of rotation of the holder, a flexible shaft extending from an actuating means through the support to the control device, the actuating means being effective to rotate the flexible shaft, and a lever associated with the shaft to vary the effectiveness of the pawls of the indexing mechanism.

2. A tool support according to claim 1 in which the actuating means include a pinion gear fixed to one end of the shaft and meshing with a rack, and a piston-cylinder device for reciprocating the rack.

* * * * *